United States Patent
Saito et al.

(10) Patent No.: US 7,542,108 B2
(45) Date of Patent: Jun. 2, 2009

(54) LIQUID CRYSTAL DISPLAY DEVICE

(75) Inventors: Ken Saito, Mobara (JP); Kazuhiro Ishida, Mobara (JP)

(73) Assignees: Hitachi, Ltd., Tokyo (JP); Hitachi Electronic Devices Co., Ltd., Chiba-ken (JP)

( * ) Notice: Subject to any disclaimer, the term of this patent is extended or adjusted under 35 U.S.C. 154(b) by 0 days.

(21) Appl. No.: 11/270,537

(22) Filed: Nov. 10, 2005

(65) Prior Publication Data

US 2006/0055849 A1    Mar. 16, 2006

Related U.S. Application Data

(63) Continuation of application No. 10/055,969, filed on Jan. 28, 2002, now abandoned.

(30) Foreign Application Priority Data

Feb. 16, 2001    (JP)    ............... 2001-039522

(51) Int. Cl.
   G02F 1/1335    (2006.01)
   G02F 1/1333    (2006.01)
(52) U.S. Cl. .......................... 349/64; 349/58
(58) Field of Classification Search ............. 349/61–67, 349/58–60
   See application file for complete search history.

(56) References Cited

U.S. PATENT DOCUMENTS

| | | | |
|---|---|---|---|
| 5,606,438 A | 2/1997 | Margalit et al. | |
| 5,629,784 A | 5/1997 | Abileah et al. | |
| 5,929,951 A | 7/1999 | Sasakura et al. | |
| 6,016,175 A * | 1/2000 | Kim | 349/58 |
| 6,290,364 B1 | 9/2001 | Koike et al. | |
| 6,504,661 B1 | 1/2003 | Odille et al. | |
| 6,518,946 B2 | 2/2003 | Ode et al. | |
| 6,580,477 B1 | 6/2003 | Cho | |
| 6,590,625 B1 | 7/2003 | Umemoto et al. | |
| 6,880,953 B2 * | 4/2005 | Shin | 362/225 |
| 2001/0019377 A1 | 9/2001 | Fukayama et al. | |
| 2003/0234895 A1 * | 12/2003 | Sugawara et al. | 349/58 |

FOREIGN PATENT DOCUMENTS

JP    01-270023    4/1988

(Continued)

OTHER PUBLICATIONS

Merriam-Webster's Collegiate Dictionary 10th Ed. 1999 at pp. 249 and 997.

*Primary Examiner*—Dung T. Nguyen
(74) *Attorney, Agent, or Firm*—Reed Smith LLP; Juan Carlos A. Marquez, Esq.

(57) ABSTRACT

In a liquid crystal display device, a transparent sheet TPS is provided to a surface of a diffusion plate SCT which faces a light source (cold cathode fluorescent lamps CFL). The whole or at least respective portions of four sides forming peripheries of the transparent sheet TPS and the diffusion plate SCT are adhered to each other using a pressure sensitive adhesive double-sided tape or the like thus sealing a gap defined between them in a complete state or in an incomplete state with respect to outside air so that the drying conditions at a liquid-crystal-display element side and a light-source side of the diffusing plate SCT become equal.

12 Claims, 10 Drawing Sheets

FOREIGN PATENT DOCUMENTS

| | | |
|---|---|---|
| JP | 04-85519 | 7/1990 |
| JP | 4-40409 | 8/1990 |
| JP | 6-95105 | 1/1991 |
| JP | 5-4133 | 7/1991 |
| JP | 6-301034 | 4/1993 |
| JP | 7-64084 | 8/1993 |
| JP | 7-22414 | 9/1993 |
| JP | 7-234405 | 2/1994 |
| JP | 08-254700 | 3/1995 |
| JP | 10-56248 | 8/1996 |
| JP | 10-105074 | 9/1996 |
| JP | 10-188639 | 12/1996 |
| JP | 10-326517 | 5/1997 |
| JP | 11-223812 | 2/1998 |
| JP | 2000-019990 | 1/2000 |
| JP | 2000-19990 | 1/2000 |
| JP | 2001-194666 | 7/2001 |
| JP | 2001-215497 | 8/2001 |
| KR | 10-2000-68334 | 11/2000 |

* cited by examiner

*Prior Art*

Prior Art

LIQUID CRYSTAL DISPLAY DEVICE

CROSS-REFERENCE TO RELATED APPLICATIONS

This application is a Continuation of U.S. application Ser. No. 10/055,969 filed Jan. 28, 2002, now abandoned, and claims priority to U.S. application Ser. No. 10/055,969 filed Jan. 28, 2002, which claims priority to Japanese Patent Application No. 2001-039522 filed on Feb. 16, 2001, all of which is incorporated by reference.

BACKGROUND OF THE INVENTION

1. Field of the Invention

The present invention relates to a liquid crystal display device mounting a direct light source on a liquid crystal display element, and more particularly, to a liquid crystal display device which can irradiate the illumination light of the uniform brightness with respect to the liquid crystal display element by suppressing a warp of a diffusion plate which is arranged between the direct light source and the liquid crystal display element.

2. Description of the Related Art

There has been known a liquid crystal display device which is provided with a light source which illuminates a liquid crystal panel for observing an electronic tent image formed on a liquid crystal panel as a clear visible image. This type of light source is a so-called backlight which constitutes a light source which illuminates the liquid crystal display element from a back surface thereof. Hereinafter, the light source is also referred to as "backlight".

As such a backlight, a side-edge backlight which arranges a linear lamp (a fluorescent lamp, particularly a cold cathode fluorescent lamp being used popularly) at a side surface of a light guide plate made of a transparent plate formed by molding using acrylic resin or the like, and a direct backlight which arranges one or a plurality of linear lamps right below a back surface of the liquid crystal panel have been known.

A notebook type computer which is required to be as thin as possible adopts the side-edge backlight and a liquid crystal display monitor for a liquid crystal display device also mainly adopts the side-edge backlight to shorten a depth of the display device.

With respect to a large-sized liquid crystal display device such as a display monitor, the acquisition of a high contrast and bright color display image and the prevention of the deterioration of brightness even after the use for a long time constitute inevitable requirements and hence, a liquid crystal display device of a type (direct type) which arranges a plurality of linear lamps right below the liquid crystal panel has been commercialized.

FIG. 14 is a cross-sectional view which is served for explaining a constitutional example of the liquid crystal display device which is provided with the direct backlight. In the drawing, PNL indicates a liquid crystal display element (a liquid crystal panel) which generates an image electronically. The liquid crystal display element sandwiches a liquid crystal layer LC between a pair of glass substrates SUB1, SUB2 and generates an image by selectively applying voltage to electrodes or switching elements for pixel selecting which are formed on either one or both of the glass substrates SUB1, SUB2.

Further, the polarizers PL1, PL2 are laminated to respective outer surfaces of the glass substrates SUB1, SUB2. The polarizers PL1, PL2 control the polarization of the illumination light from a backlight BL so as to make the light which passes through the liquid crystal layer LC irradiate from the upper-side polarizer (PL2) or interrupt the irradiation.

The backlight BL is constituted of a plurality of cold cathode fluorescent lamps CFL, a reflection plate REF, a diffusion plate SCT which controls the distribution of illumination light irradiated from the cold cathode fluorescent lamps CFL, and an optical sheet OPS which is constituted of a laminated body formed of at least one diffusion sheet SC which controls the direction of the illumination light and at least one prism sheet PRS. The backlight BL is mounted on a back surface of the liquid crystal display device PNL.

FIG. 15 is a cross-sectional view which is served for schematically explaining a specific example of the backlight BL shown in FIG. 14. In the direct backlight, the diffusion plate SCT which has a relatively large thickness and is formed of an acrylic resin plate, a polycarbonate resin plate or the like is arranged above and close to a plurality of cold cathode fluorescent lamps CFL which constitute the light source.

Further, on a surface of the diffusion plate SCT which is disposed right above and faces the cold cathode fluorescent lamps CFL in an opposed manner, a reflection light shielding pattern for correcting the brightness irregularities is formed by printing or the like. The reflection light shielding pattern is adjusted to make the illumination light which illuminates the liquid crystal display element obtain the optimum brightness distribution when the diffusion plate is flat.

The cold cathode fluorescent lamps CFL which constitute the backlight are mounted along valley portions of mountain-like reflection plates REF arranged in the inside of a metal-made lower frame FLM-D made of an aluminum plate or an iron plate. On the diffusion plate SCT which is arranged above the cold cathode fluorescent lamps CFL, the optical sheet OPS which is constituted of a laminated body consisting of at least one diffusion sheet SC and at least one prism sheet PRS is mounted in a superposed manner. Then, an upper frame FLM-U is engaged with and integrally formed with a lower frame FLM-D.

However, since the diffusion plate SCT is arranged close to the cold cathode fluorescent lamps CFL, when a given time elapses after the cold cathode fluorescent lamps CFL are turned on, a warp which forms the diffusion plate SCT in a projected form toward the liquid crystal display element side, for example, is generated so that there is a possibility that the flatness of the diffusion plate SCT is spoiled. When the flatness of the diffusion plate SCT is spoiled, the brightness distribution adjustment using the reflection light shielding pattern formed on the diffusion plate SCT gives rise to irregularities so that the illumination light irradiated to the liquid crystal display element cannot obtain the uniform brightness distribution.

To cope with such an inconvenience, a liquid crystal display device which arranges a light transmission sheet (hereinafter called "a transmission sheet") at a back surface (a light source side) of the diffusion plate has been proposed (Japanese Laid-open Patent Publication 223812/1999). In this related art, a transparent sheet is brought into close contact with a back surface of the diffusion plate so as to decrease the contact of a light source side of the diffusion plate with outside air whereby the drying of the light source side of the diffusion plate is suppressed thus preventing the deformation of the diffusion plate.

Further, with respect to the deformation of the diffusion plate, Japanese Laid-open Patent Publication 326517/1998 discloses a liquid crystal display device which installs support columns (spacers) between a frame and a diffusion plate of a light source to prevent the downward deflection of a center portion due to the deadweight of the diffusion plate generated along with the lapse of time due to the use of the liquid crystal display device for a long period.

As other literatures which disclose the related art on the direct liquid crystal display device, Japanese Accepted Patent Publication 13666/1976, Japanese Laid-open Patent Publication 309921/1988 and the like can be named, for example.

SUMMARY OF THE INVENTION

As shown in FIG. 15, above (liquid-crystal-display element side) the diffusion plate SCT, the optical sheet OPS which is formed by sandwiching the prism sheet PRS with two diffusion sheets SC-D, SC-U is laminated. The prism sheet PRS may be formed of a single sheet or may be used in a form that other prism sheet is superposed on the prism sheet PRS, wherein the groove directions of these sheets intersects each other.

Here, the structure of the diffusion sheet and the prism sheet is not limited to the above-mentioned example and only a single diffusion sheet, a combination of one diffusion sheet and two prism sheets which are laminated to each other, a combination of one diffusion sheet and one prism sheet and other combinations are known. On the other hand, a lower side (a light source side) of the diffusion plate SCT is disposed close to the light source (cold cathode fluorescent lamps CFL).

In such a constitution, it is considered that the light-source-side surface of the diffusion plate is projected due to the elevation of temperature and hence, the deformation of the diffusion plate which makes the diffusion plate projected toward the light source side occurs. However, the fact is that the diffusion plate is projected toward the liquid crystal display element side in most cases.

As a result of analysis of such a phenomenon, it has been found that the light-source-side surface of the diffusion plate is more liable to be easily dried than the liquid-crystal-display-element side surface of the diffusion sheet with which the optical sheet is brought into contact and the diffusion plate is liable to be projected toward the liquid-crystal-display-element side due to the difference of the drying conditions of both surfaces.

It is considered that Japanese Laid-open Patent Publication 223812/1999 suppresses the drying of the light-source-side surface of the diffusion plate by mounting a transparent sheet on the light-source-side surface of the diffusion plate. However, in such a constitution, it is understood that the transparent sheet is brought into close contact with the diffusion plate. Since this contact is not considered to constitute the adhesion, a gap is formed between the diffusion plate and the transparent sheet although the gap is minute. While the, moisture leaks through this gap, a gap defined between the optical sheet which is laminated to the liquid-crystal-display-element side of the diffusion plate and the diffusion plate is narrower than the gap between the diffusion plate and the light-source-side transparent sheet due to the deadweight of the optical sheet. Further, the circulation of air through the gap defined between the optical sheet which is laminated to the liquid-crystal-display-element side of the diffusion plate and the diffusion plate is smaller than the circulation of air through the gap between the diffusion plate and the light-source-side transparent sheet whose temperature is liable to be elevated faster, the moisture is difficult to escape (difficult to be dried) and hence, the prevention of the projecting of the diffusion plate toward the liquid-crystal-display element side is less than optimal.

Further, with respect to the related art disclosed in Japanese Laid-open Patent Publication 223812/1999, the description that the optical sheet (the diffusion sheet or the prism sheet) or the transparent sheet is brought into close contact with the diffusion plate implies that the transparent sheet or the like is simply superposed on the diffusion plate. That is, based on the fact that the optical sheet (the diffusion sheet or the prism sheet) which is arranged on the diffusion plate (the liquid-crystal-display-element side) is usually simply superposed on the diffusion plate without using a tacky adhesive agent or an adhesive agent, the fact that no specific description is made with respect to the arrangement of the diffusion plate and the transparent sheet, and a comparison of such a constitution with an embodiment which makes the humidity conditions of front and back surfaces of a diffusion plate equal by providing support portions which form a gap (an air layer) between the diffusion plate and the optical sheet without using a transparent plate, it is understood that the above-mentioned close contact of the optical sheet means to simply superpose the optical sheet on the diffusion plate so as to bring them into close contact with each other. Based on this understanding, it is understood that the meaning of close contact between the diffusion plate and the transparent sheet means to simply superpose them each other and bringing them into close contact with each other in the similar manner.

Accordingly, even when the transparent sheet is only arranged at the light-source side of the diffusion plate as mentioned above, the moisture leaks through the fine gap formed between the diffusion plate and the transparent sheet and hence, it is still less than optimal to prevent the diffusion plate from being projected toward the liquid-crystal-display-element side.

Further, as mentioned above, there may be a case that, when the diffusion plate is used for a long period, due to the deadweight of the diffusion plate and the presence of the optical sheet laminated to the diffusion plate, the center portion of the diffusion plate is deflected downwardly and causes the irregularities of brightness.

This constitutes another task to be solved in the technical field of the present invention.

Accordingly, it is an object of the present invention to provide a liquid crystal display device which can overcome the above-mentioned problems and enables the irradiation of illumination light of uniform brightness distribution to a liquid crystal display element for a long time by suppressing a warp or a downward deflection of a diffusion plate disposed between a direct light source (backlight) and the liquid crystal display element.

To achieve the above-mentioned object, according to the present invention, a transparent sheet is provided to a surface (a lower surface) of a diffusion plate which faces a light source in an opposed manner, and the whole or at least respective portions of four sides which constitute peripheries of the transparent sheet and the diffusion plate (the diffusion plate and the transparent sheet being formed in a rectangular shape) are adhered to each other so that the drying conditions at a liquid-crystal-display-element side and a light-source side of the diffusion plate can be made substantially equal.

Further, according to the present invention, a transparent sheet is provided to a surface (a lower surface) of a diffusion plate which faces a light source in an opposed manner, and a spacer is interposed between the diffusion plate and the light source. Accordingly, the downward deflection of a center portion of the diffusion plate brought about by the deadweight of the diffusion plate and the superposed optical sheet when the liquid crystal display device is used for a long period and hence, a warp of the diffusion plate projected toward the light source side due to the difference of the drying conditions can be prevented. Typical constitutions of the present invention are listed hereinafter.

(1) In a liquid crystal display device comprising a substantially rectangular diffusion plate which is interposed between a liquid crystal display element and a light source, at least one optical sheet which is arranged between the diffusion plate and the liquid crystal display element, and a transparent sheet which is arranged between the diffusion plate and the light source and has a contour which is substantially equal to a contour of the diffusion plate, at least one optical sheet is arranged to be brought into contact with the diffusion plate and the whole portions of four sides of the optical sheet or respective major portions or respective whole portions of four sides of the transparent sheet are adhered to the diffusion plate.

Although the whole of the four sides can be adhered, that is, although the four sides can be adhered without any gaps, even when respective portions of the four sides are adhered, that is, even when the four sides are adhered with the presence of some gaps, such a constitution is still effective compared to a liquid crystal display device which has no such a constitution.

Due to such a constitution, the drying conditions at the optical-sheet side and the transparent-sheet side of the diffusion plate become substantially equal and hence, it becomes possible to prevent a warp of the diffusion plate whereby the brightness distribution of the illumination light irradiated to the liquid crystal display element can be held uniform. Further, even when a warp is generated, the period until the warp occurs can be prolonged.

(2) With respect to the constitution (1), the whole four sides of the transparent sheet are adhered to the diffusion plate. In the state that four sides of the transparent sheet and the diffusion plate are adhered to each other, the degree of sealed state between the transparent sheet and the diffusion plate is classified as follows. That is, in the first state, the whole four sides of the transparent sheet and the diffusion plate are adhered to each other continuously without any gaps (this state being referred to as "completely sealed state") and, in the second state, neighboring portions of the four sides or respective portions of the four sides of the transparent sheet and the diffusion sheet are adhered to each other in an intermittent or in a discontinued manner so that the inside defined between them is partially communicated with outside air (this state being referred to as "incompletely sealed state").

The surface of the diffusion plate which faces the light source is more liable to be easily dried compared to the surface of the diffusion plate which faces the liquid crystal display element. Due to the above-mentioned constitution, it becomes possible to suppress the occurrence of a warp of the diffusion plate projected toward the liquid-crystal-display-element side which is caused by a phenomenon that the drying of the transparent sheet side of the diffusion plate progresses faster than the drying of the liquid-crystal-display-element side of the diffusion plate when the light source is lit for a long time. Accordingly, the brightness distribution of the illumination light irradiated to the liquid crystal display element can be held uniform. By setting the degree of the sealed state between the transparent sheet and the diffusion plate to the completely sealed state, the occurrence of the warp can be suppressed for a long time.

(3) With respect to the constitution (1) or (2), the transparent sheet is adhered to the diffusion plate using a pressure sensitive adhesive double-sided tape or a tacky adhesive agent.

As means for adhering two plate-like or sheet-like members, a pressure sensitive adhesive double-sided tape or a tacky adhesive agent can be used. Using such a member as the means for adhering the transparent sheet to the diffusion plate, the degree of the sealed state between the transparent sheet and the diffusion plate can be set to the completely sealed state or the incompletely sealed state with respect to the outside air without necessitating special adhering means.

(4) With respect to any one of the constitutions (1) to (3), at least one optical sheet is adhered to the diffusion plate.

By adhering the optical sheet which is mounted on the liquid-crystal-display element side of the diffusion plate in the same manner as the transparent sheet, it becomes possible to reliably make the drying conditions at both sides, that is, the upper and lower sides of the diffusion plate equal so that a warp of the diffusion plate can be suppressed even when the liquid crystal display device is used for a long time.

(5) With respect to the constitutions (1) to (3), the liquid crystal display device is provided with a spacer for restricting a warp quantity of the diffusion plate in the direction toward the light source. The warp of the diffusion plate which is projected toward the light source side can be suppressed by providing the spacer between the light source and the diffusion plate.

Unless the transparent sheet is provided to the light source side of the diffusion plate, the diffusion plate generates a warp which is projected toward the liquid-crystal-display-element side. The above-mentioned spacer cannot restrict such a warp. Accordingly, by adhering the above-mentioned transparent sheet to the light source side of the diffusion plate, the occurrence of the warp which is projected toward the liquid-crystal-display-element side can be suppressed.

Here, depending on the adhering method of the transparent sheet (the whole four sides which constitute the peripheries of the transparent sheet and the diffusion plate or respective portions of these four sides) or the environment in which the liquid crystal display device is used, there may be a case in which the occurrence direction of the warp is projected toward the light source side. Further, there may be a case in which the liquid crystal display device is designed such that the degree of sealed state between the transparent sheet and the diffusion plate is adjusted such that the occurrence direction of the warp is projected toward the light source side by predicting the environment in which the liquid crystal display device is used. Further, the diffusion plate tends to be projected toward the light source side due to the dead weight of the diffusion plate along with the lapse of time.

To suppress the distance between the diffusion plate and the light source to a predetermined value in such a case, the spacer which restricts the diffusion plate from projecting toward the light source side is provided between the light source and the diffusion plate. That is, by preventing at least the occurrence of the warp of the diffusion plate which is projected toward the liquid-crystal-display-element side and by restricting the warp of the diffusion plate toward the light source side using the spacer, the tolerance of the design can be enhanced and the warp can be reliably prevented.

(6) With respect to the constitutions (1) to (3), a spacer which suppresses an a quantity of a warp of the diffusion plate in the light source direction is provided and at least one optical sheet is adhered to the diffusion sheet.

Even when the optical sheet to be mounted on the liquid-crystal-display-element side of the diffusion plate and the transparent sheet to be mounted on the light-source side of the diffusion plate are respectively adhered to the diffusion plate so as to make the drying conditions at both sides equal, there may be a case that the warp which is projected toward the light source side may occur due to the deadweight of the diffusion plate. Further, there may be a case that the diffusion plate is swelled or expanded due to heat. The provision of the spacer can prevent the occurrence of such a warp.

(7) In a liquid crystal display device comprising a substantially rectangular diffusion plate which is interposed between a liquid crystal display element and a light source, at least one optical sheet which is arranged between the diffusion plate and the liquid crystal display element, a transparent sheet which is arranged between the diffusion plate and the light source and has a contour which is substantially equal to a contour of the diffusion plate, and a spacer which restricts a warp quantity of the diffusion plate in the direction toward the light source, at least one optical sheet is brought into contact with the diffusion plate and at least respective portions of four sides of the transparent sheet are adhered to the diffusion plate.

By combining the above-mentioned constitutions (5) to the above-mentioned constitutions (1) to (3), that is, due to the combination of adhesion of transparent sheet and the spacer, the warp of the diffusion plate can be further efficiently suppressed even when the liquid crystal display device is used for a long time.

(8) With respect to the constitutions (7), the whole or major portions of four sides of the transparent sheet are adhered to diffusion plate. By setting the whole four sides of the transparent sheet and the diffusion plate into the completely sealed state or the incompletely sealed state as the adhesion method in the constitution (7), the warp of the diffusion plate can be suppressed even when the liquid crystal display device is used for a long time.

(9) With respect to the constitution (7) or (8), the transparent sheet is adhered to the diffusion plate using a pressure sensitive adhesive double-sided tape or a tacky adhesive agent. With the use of such member in the constitution (7), the degree of the sealed state between the transparent sheet and the diffusion plate can be set to the completely sealed state or the incompletely sealed state with respect to the outside air without necessitating special adhering means.

(10) With respect to the constitutions (7) to (9), at least one optical sheet is adhered to the diffusion plate. By adhering the optical sheet which is mounted on the liquid-crystal-display-element side of the diffusion plate in the same manner as the transparent sheet, it becomes possible to reliably make the drying conditions at both surfaces, that is, the upper and lower surfaces of the diffusion plate equal so that the warp of the diffusion plate can be suppressed even when the liquid crystal display device is used for a long time.

(11) In a liquid crystal display device comprising a substantially rectangular diffusion plate which is interposed between a liquid crystal display element and a light source, and at least one optical sheet which is arranged between the diffusion plate and the liquid crystal display element, a transparent sheet which is arranged between the diffusion plate and the light source and has a contour which is substantially equal to a contour of the diffusion plate, and a spacer which restricts a warp quantity of the diffusion plate in the direction toward the light source, at least one optical sheet is brought into contact with the diffusion plate and the whole surface of the transparent sheet is adhered to the diffusion plate.

By adhering the diffusion plate to the whole surface of the transparent sheet, the drying of the light-source side of the diffusion plate is remarkably reduced so that a warp of the diffusion plate projecting toward the light-source side can be suppressed. Further, with the provision of the spacer between the light source and the diffusion plate, even when a warp of the diffusion plate which is projected toward the light-source side occurs due to the environment in which the liquid crystal display device is used or the deadweight of the diffusion plate, the brightness distribution of the illumination light irradiated to the liquid crystal display element can be uniformly held.

It is needless to say that the present invention is not limited to the above-mentioned constitutions and constitutions of embodiments which will be explained hereinafter and various modifications can be made without departing from the technical concept of the present invention.

DETAILED DESCRIPTION OF THE PREFERRED EMBODIMENTS

Embodiments of a liquid crystal display device according to the present invention are explained in detail in conjunction with drawings showing the embodiments.

Figure 1:
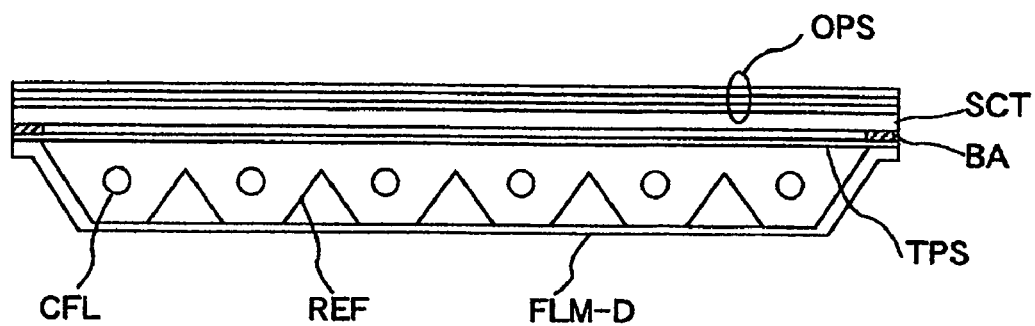
FIG. 1 is a cross-sectional view of a direct backlight for schematically explaining a first embodiment of a liquid crystal display device according to the present invention.
Figure 2:
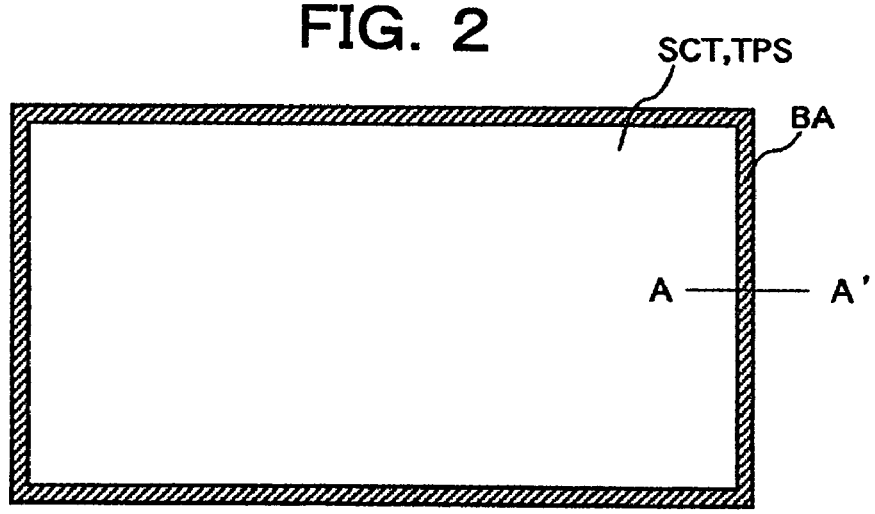
FIG. 2 is a plan view for schematically explaining the adhering state of a diffusion plate and a transparent sheet of the first embodiment of the liquid crystal display device according to the present invention.
Figure 3:
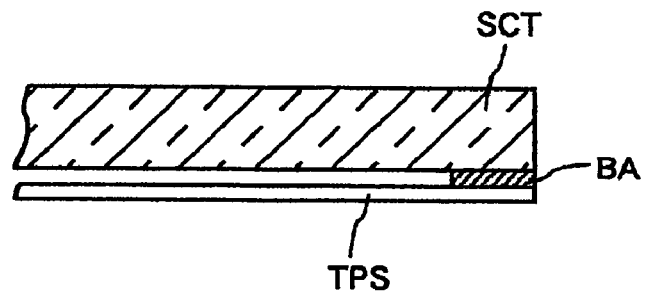
FIG. 3 is a partial cross-sectional view taken along a line A-A' of FIG. 2 for schematically explaining the first embodiment of the liquid crystal display device according to the present invention.

FIG. 1 is a cross-sectional view of a direct backlight for schematically explaining a first embodiment of a liquid crystal display device according to the present invention, FIG. 2 is a plan view for schematically explaining the adhering state of a diffusion plate and a transparent sheet shown in FIG. 1, and FIG. 3 is a partial cross-sectional view taken along a line A-A' in FIG. 2.

Here, although a liquid crystal display element is arranged above the direct backlight shown in FIG. 1, such a liquid crystal display element is omitted from the drawings.

In FIG. 1, the direct backlight of this embodiment is constituted by arranging a diffusion plate SCT having a relatively large thickness (approximately 2 mm, for example) formed of acrylic resin (or possibly polycarbonate resin) above and close to a plurality of cold cathode fluorescent lamps CFL which constitute a light source. The diffusion plate SCT is formed of a rectangular plate in the same manner as the liquid crystal display element.

Further, on a surface of the diffusion plate SCT which is disposed right above and faces the cold cathode fluorescent lamps CFL in an opposed manner, a reflection light shielding pattern for correcting the brightness irregularities is formed by printing or the like. The reflection light shielding pattern is adjusted such that the optimal brightness distribution can be obtained when the diffusion plate SCT is made flat.

The cold cathode fluorescent lamps CFL which constitute the backlight are mounted along valley portions of a mountain-like reflection plate REF which is arranged in the inside of a metal-made lower frame FLM-D which is preferably formed of an aluminum plate. Above the diffusion plate SCT which is arranged above these cold cathode fluorescent lamps CFL, an optical sheet OPS which is constituted of a diffusion sheet SC and a prism sheet PRS is arranged in a superposed manner. Further, an upper frame FLM-U is engaged with and integrally formed with a lower frame FLM-D.

Further, to the surface of the diffusion plate SCT which faces the cold cathode fluorescent lamps CFL in an opposed manner, a transparent sheet TPS having a shape and a size approximately equal to a shape and a size of the diffusion plate SCT is adhered.

The transparent sheet TPS is formed of a resin film, a PET film or the like as in the case of the optical sheet OPS. It is preferable to set a thickness of the transparent sheet TPS to 0.15 mm or more, for example, in view of the moisture permeability. The adhering state is shown in FIG. 2 and FIG. 3.

In this embodiment, all four sides, that is, the entire peripheries of the diffusion plate SCT and the transparent sheet TPS are adhered to each other using a pressure sensitive adhesive double-coated tape BA such that the inside of the adhered entire peripheries is completely sealed. Accordingly, the leaking of moisture from the inside of the adhered entire peripheries can be suppressed.

The optical sheet OPS which is mounted on the liquid-crystal-display-element side, that is, an upper surface of the diffusion plate SCT is formed of a laminated body consisting of at least one diffusion sheet SC or one prism sheet PRS. Accordingly, the optical sheet OPS is brought into close contact with the diffusion plate SCT. Further, the optical sheet OPS may have four peripheral sides thereof adhered to the diffusion plate SCT using a pressure sensitive adhesive double-coated tape or a tacky adhesive agent or may have the whole area thereof adhered to the diffusion plate SCT using a tacky adhesive agent. With respect to the manner of adhesion of the optical sheet OPS and the diffusion plate SCT, the similar manner of operation is adopted by respective embodiments which will be explained hereinafter.

In this manner, according to this embodiment, the drying conditions at the optical sheet side and the transparent sheet side of the diffusion plate can be made substantially equal so that it becomes possible to prevent the occurrence of the warp of the diffusion plate whereby the luminance distribution of the illumination light to the liquid crystal display element can be held uniform.

In a second embodiment of the liquid crystal display device according to the present invention, in place of using the pressure sensitive adhesive double-coated tape BA in the first embodiment, a tacky adhesive agent is coated on the whole periphery between the whole four sides of the diffusion plate SCT and the transparent sheet TPS by printing or using a dispenser and then they are adhered to each other.

Also according to this embodiment, the drying conditions at the optical sheet side and the transparent sheet side of the diffusion plate can be made substantially equal so that it becomes possible to prevent the occurrence of the warp of the diffusion plate whereby the luminance distribution of the illumination light to the liquid crystal display element can be held uniform.

In a third embodiment of the liquid crystal display device according to the present invention, a tacky adhesive agent is coated on the whole surfaces of the diffusion plate SCT and the transparent sheet TPS which face each other in an opposed manner using means similar to the means described above and then they are laminated to each other by adhesion.

Also according to this embodiment, the drying conditions at the optical sheet side and the transparent sheet side of the diffusion plate can be made substantially equal so that it becomes possible to prevent the occurrence of the warp of the diffusion plate whereby the luminance distribution of the illumination light to the liquid crystal display element can be held uniform.

In a fourth embodiment of the liquid crystal display device according to the present invention, the whole peripheries formed between the whole four sides of the diffusion plate SCT and a transparent sheet TPS are adhered to each other using a pressure sensitive adhesive double-coated tape BA. At the same time, a tacky adhesive agent is coated on the whole surfaces of the diffusion plate SCT and the transparent sheet TPS which face each other in an opposed manner so as to laminate them by adhesion using means similar to the above-mentioned means.

Also according to this embodiment, the drying conditions at the optical sheet side and the transparent sheet side of the diffusion plate can be made substantially equal so that it becomes possible to prevent the occurrence of the warp of the diffusion plate whereby the luminance distribution of the illumination light to the liquid crystal display element can be held uniform.

In a fifth embodiment of the liquid crystal display device according to the present invention, a pressure sensitive adhesive double-sided tape or a tacky adhesive agent which is provided between the whole peripheries respectively formed by four sides of the diffusion plate SCT and the transparent sheet TPS which face each other in an opposed manner is interposed such that the tape or the agent is discontinued at some portions thereof so that the inside formed by the adhesion is slightly communicated with outside air. That is, at least portions of respective four sides of the diffusion plate SCT and the transparent sheet TPS are adhered to each other. The magnitude of discontinued portions can be designed correspondingly to the degree of warp by taking the material and the environment in which the liquid crystal display device is used into consideration. Here, to minimize the discontinued portions, the major portions of respective four sides of the diffusion plate SCT and the transparent sheet TPS are adhered to each other.

Here, usually, when the cut pressure sensitive adhesive double-sided tapes are respectively adhered to the above-mentioned four sides or when the adhesive agent is respectively coated on the four sides, there may be a case that a gap is formed more or less between the pressure sensitive adhesive double-sided tapes or the tacky adhesive agents on the neighboring sides. According to the fifth embodiment, by making use of this gap, the inside formed between the diffusion plate SCT and the transparent sheet TPS can be made partially communicated with outdoor air (incompletely sealed state) so that the drying condition inside can be arbitrarily adjusted.

Figure 4:
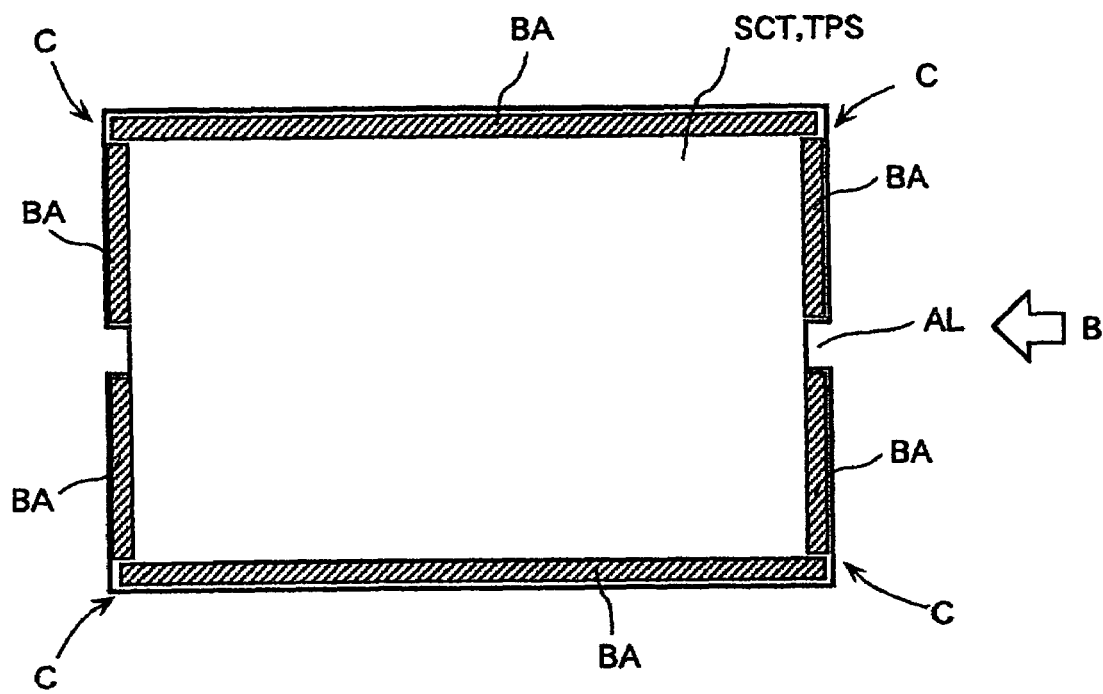
FIG. 4 is a plan view for schematically explaining the adhering state of the diffusion plate and the transparent sheet which constitute the direct backlight for schematically explaining the sixth embodiment of the liquid crystal display device according to the present invention.
Figure 5:
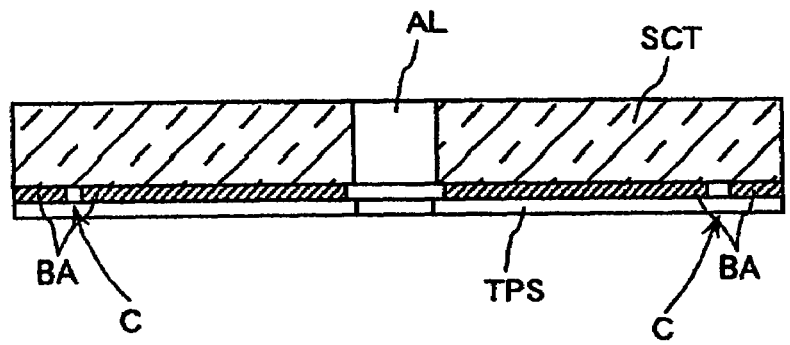
FIG. 5 is a side view as viewed from the direction of an arrow B in FIG. 4 for schematically explaining the sixth embodiment of the liquid crystal display device according to the present invention.

FIG. 4 is a plan view for schematically explaining the adhering state of the diffusion plate and the transparent sheet which constitute a direct backlight for schematically explaining the sixth embodiment of the liquid crystal display device according to the present invention. FIG. 5 is a schematic side view as viewed from the direction of an arrow B shown in FIG. 4.

In this embodiment, at portions of outer peripheries of a diffusion plate SCT and a transparent sheet TPS, notches AL are formed so as to position them with respect to a lower frame FLM-D. In this embodiment, one notch AL is formed at each short side of the diffusion plate SCT and the transparent sheet TPS.

On respective four sides of the diffusion plate SCT, individual pressure sensitive adhesive double-sided tapes BA are mounted. The pressure sensitive adhesive double-sided tapes BA are mounted on portions of the short sides while avoiding portions where the notches AL are formed. Accordingly, at the portions where the notches AL are formed, the gaps indicated by an arrow C in FIG. 4 and FIG. 5 are formed.

In this embodiment, the inside of the diffusion plate SCT and the transparent sheet TPS becomes the incompletely sealed state with respect to outside air and the minute gaps which make the inside communicated with the outside air are formed. In the same manner as the constitution explained in the fifth embodiment, the drying condition of the inside of the diffusion plate SCT and the transparent sheet TPS can be adjusted in response to the magnitude of the gaps.

According to this embodiment, the drying conditions at the optical sheet side and the transparent sheet side of the diffusion plate can be made substantially equal so that it becomes possible to prevent the occurrence of the warp of the diffusion plate whereby the luminance distribution of the illumination light to the liquid crystal display element can be held uniform.

In this embodiment, in place of the pressures sensitive adhesive double-sided tape BA, a tacky adhesive agent can be used. Since an advantageous effect brought about by this constitution is similar to the advantageous effect obtained by the previous embodiment, the repeated explanation is omitted here.

Figure 6:
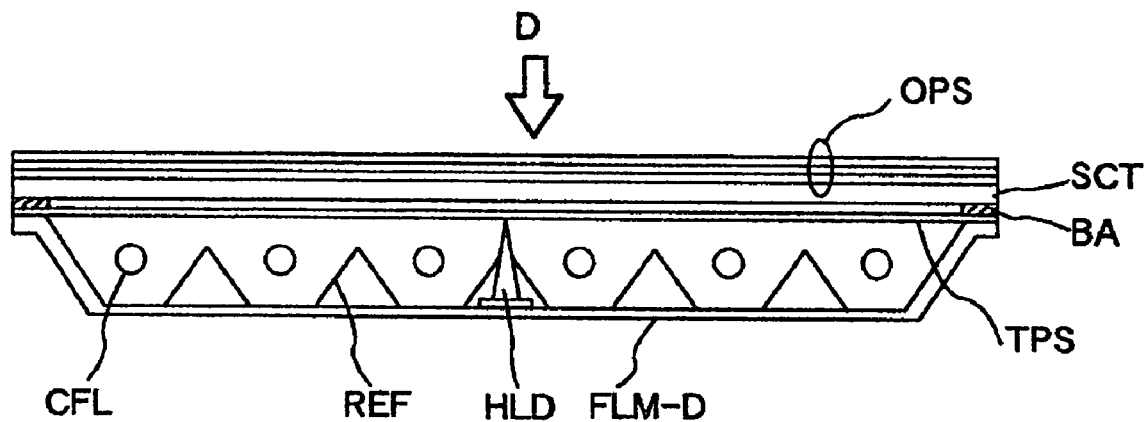
FIG. 6 is a cross-sectional view of the direct backlight for schematically explaining the seventh embodiment of the liquid crystal display device according to the present invention.
Figure 7:
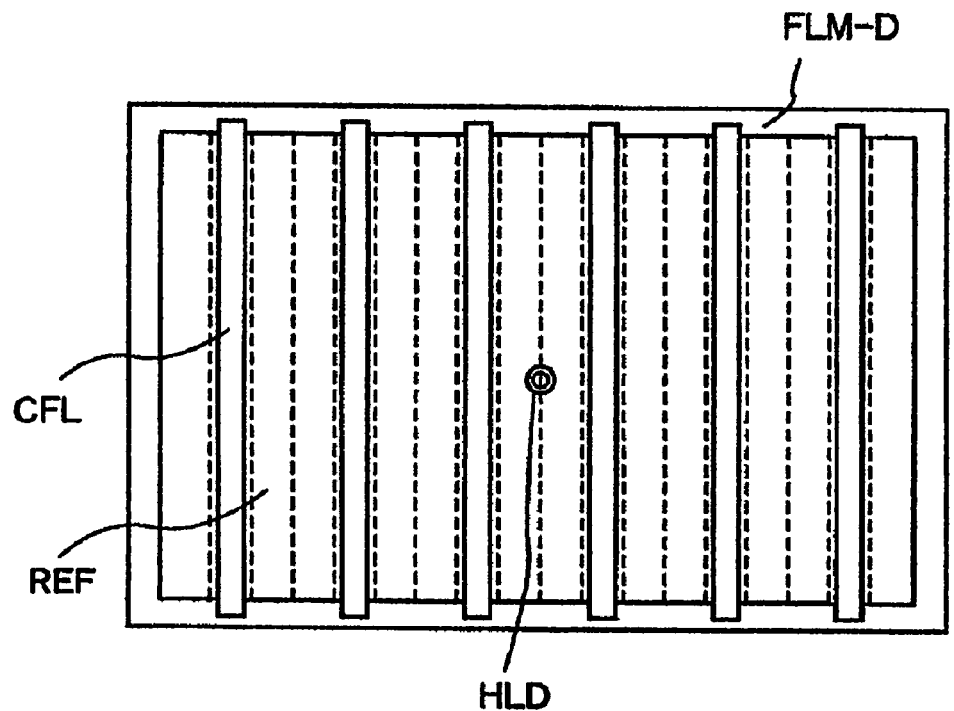
FIG. 7 is a plan view as viewed from the direction of an arrow D in FIG. 6 for schematically explaining the seventh embodiment of the liquid crystal display device according to the present invention.
Figure 8:
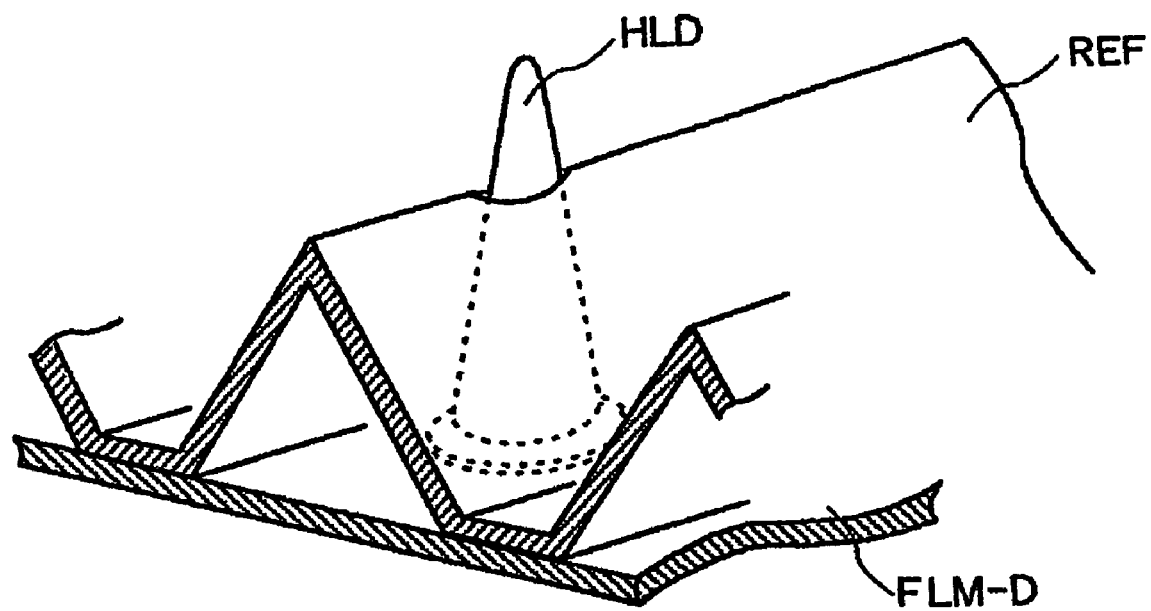
FIG. 8 is a perspective view of an essential part for schematically explaining the seventh embodiment of the liquid crystal display device according to the present invention.

FIG. 6 is a cross-sectional view of the direct backlight for schematically explaining the seventh embodiment of the liquid crystal display device according to the present invention, FIG. 7 is a plan view of the backlight as viewed from the direction of an arrow D in FIG. 6, and FIG. 8 is a perspective view of an essential part of the backlight. Here, FIG. 7 is a plan view as viewed in the state that an optical sheet OPS shown in FIG. 6 is removed. Reflection surfaces of a reflection plate REF mounted on an inner surface of a lower frame FLM-D form a plurality of parallel mountain shapes and cold cathode fluorescent lamps CFL are arranged along valley portions thereof.

According to this embodiment, in the same manner as the above-mentioned respective embodiments, a transparent sheet TPS is adhered to a diffusion plate SCT using a pressure sensitive adhesive double-sided tape or a tacky adhesive agent so as to insulate the inside thereof from the outside thereof whereby the drying conditions on both of upper and lower surfaces of the diffusion plate SCT and the transparent sheet TPS can be made equal.

Further, according to this embodiment, to suppress a distance between the diffusion plate SCT and a light source to a predetermined value even when the diffusion plate SCT is projected toward the light source (the cold cathode fluorescent lamp) due to the deadweight thereof as time lapses, a spacer HLD is disposed between the light source and the diffusion plate SCT. Further, the degree of adhesion, that is, the degree of the sealed state is adjusted such that, even when the warp is generated, the direction of the warp is intentionally designed to be projected toward the light source side. Accordingly, the warp can be restricted by the spacer HLD so that the occurrence of the warp can be suppressed.

As shown in FIG. 8, in this embodiment, the spacer HLD is formed of a column shape which is preferably made of hard resin. Here, the spacer HLD has a circular conical shape. However, even when the shape of the spacer HLD is a trigonal pyramid, a quadrangular pyramid, other multipyramid, a circular column or a rectangular column, the same advantageous effect can be obtained. When the spacer HLD is formed in the circular conical shape, light irradiating from the cold cathode fluorescent lamps can be reflected in a specific direction so that the irregularity of the brightness distribution can be reduced.

The spacer HLD is arranged such that the single spacer HLD is provided to the center of the plane of the backlight and has a base bottom portion thereof fixed to a lower frame FLM-D in an erected posture using an adhesive agent, wherein a distal end of the spacer HLD penetrates a crest portion of the mountain of the reflection plate REF and is brought into contact with the diffusion plate SCT so as to support the downward deflection (the warp projected toward the light source side) of the diffusion plate SCT.

The spacer HLD is not limited the case shown in FIG. 8 where one spacer HLD is formed on the center of the plane of the backlight. That is, when the size of a screen is large, the weight of the diffusion plate also becomes large. In such a case, the distance between the diffusion plate SCT and the light source can be suppressed to the predetermined value by uniformly arranging a plurality of spacers HLD which support the diffusion plate on a plane of a backlight.

According to this embodiment, the deformation of the diffusion plate can be prevented and hence, the brightness distribution of the illumination light to a liquid crystal display element can be held uniform.

Subsequently, the evaluation obtained by reviewing the result of suppression effect of the warp of the diffusion plate used in the backlight of the liquid crystal display device according to the present invention is explained hereinafter. Here, the result of measurements of warp respectively obtained with respect to the constitution of the above-mentioned embodiment (the embodiment in which the diffusion plate and the transparent sheet are adhered to each other at four sides while forming gaps at portions thereof as shown in FIG. 4) (hereinafter referred to as "diffusion plate structure with the adhered transparent sheet") and a comparison example in which although the transparent sheet is provided, the transparent sheet is simply superposed on the diffusion plate and is not adhered (hereinafter referred to as "diffusion plate structure with the non-adhered transparent sheet") are shown in comparison. Here, optical sheets are adhered to and are brought into close contact with respective upper surfaces of both diffusion plate structures, that is, respective surfaces of both diffusion plate structures which face the liquid crystal display element in an opposed manner.

Figure 9:
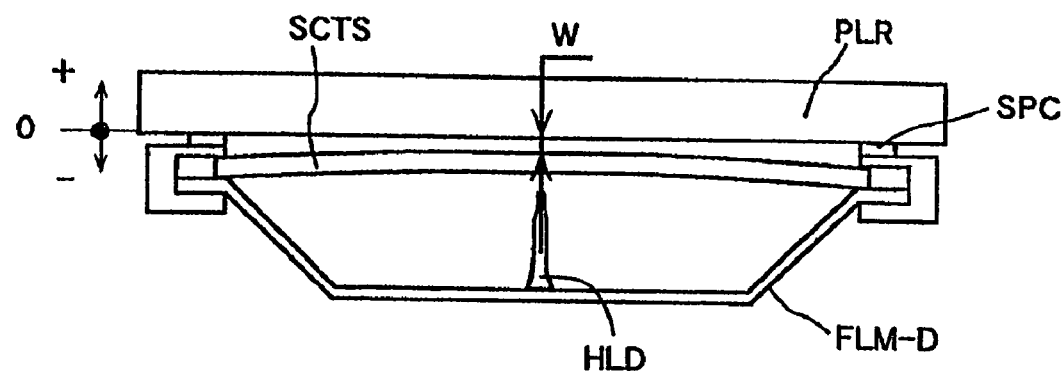
FIG. 9 is a cross-sectional view for schematically explaining a device for measuring a warp of a diffusion plate structure.

FIG. 9 is a cross-sectional view for schematically explaining a measuring device of a warp of a diffusion plate structure. In the measuring device shown in the drawing, a diffusion plate structure SCTS is mounted on a lower frame FLM-D and a planar plate PLR (a scale) is mounted on the diffusion plate structure SCTS by way of spacers SPC and the change of the distance between an upper surface of the diffusion plate structure SCTS and a lower surface of the planar plate PLR is measured as a warp W. The measuring device is also provided with a spacer HLD so as to restrict a warp quantity when the diffusion plate structure SCTS is projected toward a side opposite to the planer plate PLR.

Figure 10:
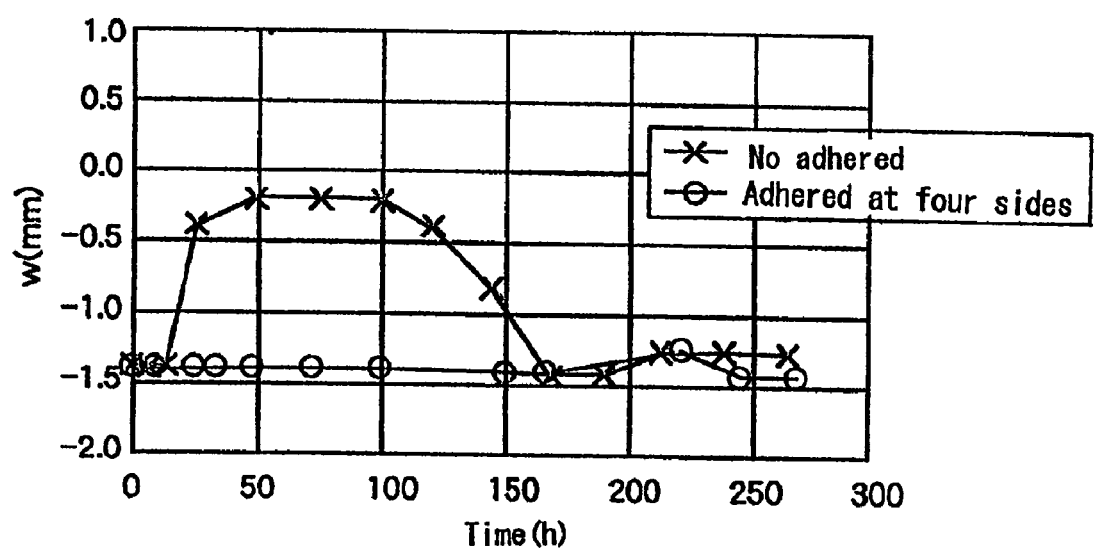
FIG. 10 is an explanatory view of a result obtained by measuring the warp of a diffusion plate structure to which a transparent sheet is adhered and the warp of a diffusion plate structure to which a transparent sheet is not adhered which constitutes a comparison example.

FIG. 10 is an explanatory view of a result which is obtained by measuring the warp of the diffusion plate structure with the adhered transparent sheet and the warp of the diffusion plate structure, with the non-adhered transparent sheet using the measurement device explained in FIG. 9. Time (h) is taken on an axis of abscissas and a warp quantity (mm) is taken on an axis of ordinates. A lower surface of the planar plate PLR is set as the reference level [0] and the relative upwardly projecting warp is indicated by [+] and the relative downwardly projecting warp is indicated by [−] with respect to the reference level [0].

In FIG. 10, a graph plotted by [o] indicates a change of a warp quantity of the diffusion plate structure (adhered at four sides) of the present invention and a graph plotted by [×] indicates a change of a warp quantity of the diffusion plate structure of the comparison example (no adhesion).

By mounting the diffusion plate structure on the above-mentioned measuring device and then by holding this state for 250 hours at maximum, while a warp quantity of the diffusion plate structure according to the present invention was hardly changed, the warp of the conventional diffusion plate structure exhibited a large change which is projected upwardly. In the drawing, the warp observed around 220 hours is considered to be an error in measurement.

As apparent from the result of this evaluation, it is understood that the diffusion plate structure with the adhered transparent sheet of the present invention does not generate the warp during the use thereof for a long time. Accordingly, the brightness distribution of the illumination light to the liquid crystal display element can be held uniform.

A specific example of a backlight into which the diffusion plate structure explained in the above-mentioned embodiments of the present invention is incorporated is explained hereinafter.

Figure 11:
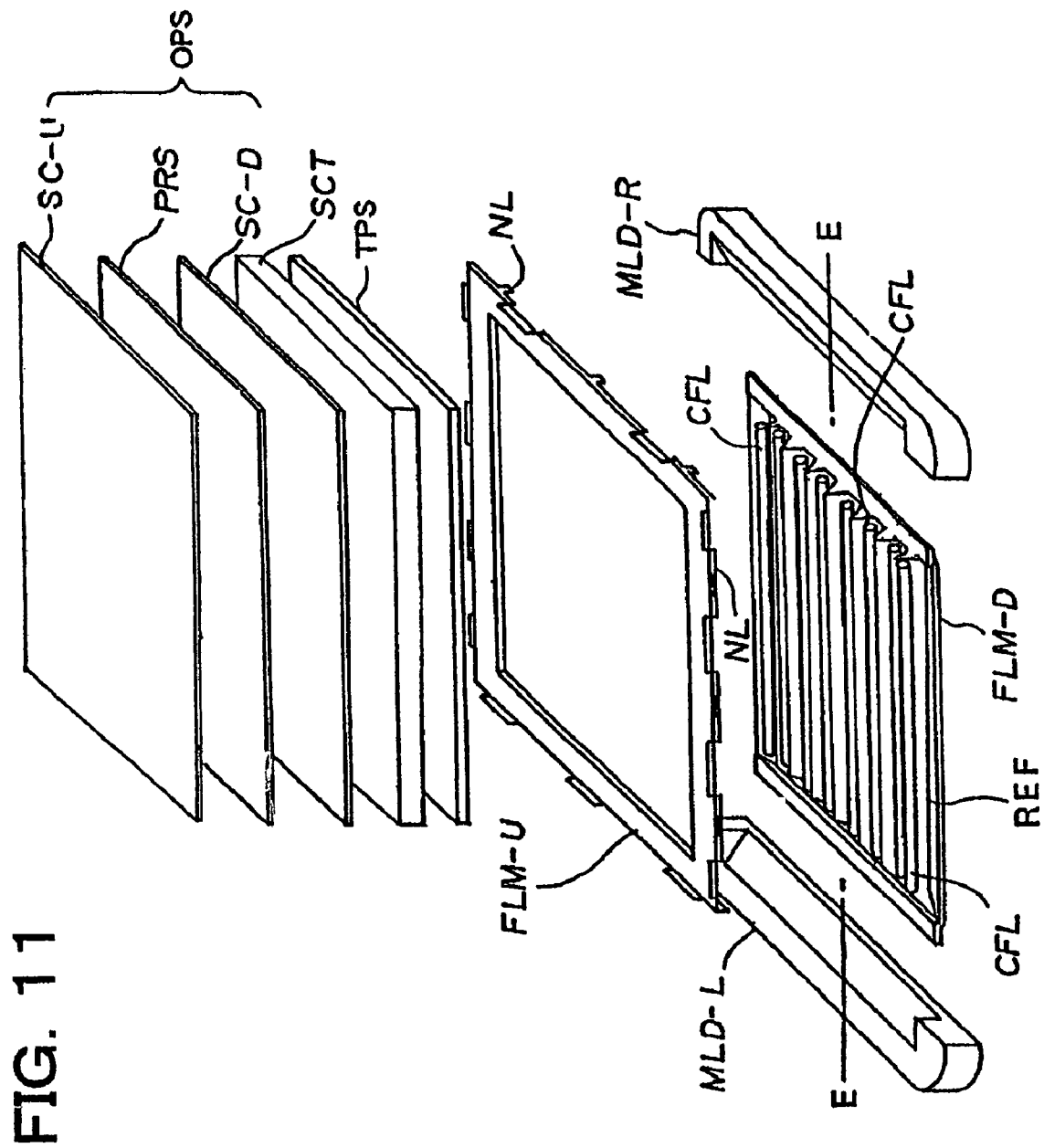
FIG. 11 is a developed perspective view for explaining the constitution of the backlight according to the present invention.

FIG. 11 is a developed perspective view for explaining the constitution of the backlight according to the present invention. In general, on an upper surface of a lower frame FLM-D which is made of metal material, a plurality of cold cathode fluorescent lamps CFL are arranged such that their longitudinal directions are parallel to each other. The lower frame FLM-D is covered with an upper frame FLM-U and both frames are coupled using pawls NL. Then, both sides (left and right sides) of the lower frame FLM-D and the upper frame FLM-U are sandwiched by a mold MLD-L (a left mold) and a mold MLD-R (a right mold) which are made of resin material thus integrally forming the backlight. The lower frame FLM-D is provided with a reflection plate REF at a cold-cathode-fluorescent-lamp CFL side thereof.

Then, on the upper frame FLM-U, a diffusion plate SCT which adheres a transparent sheet TPS to a cold-cathode fluorescent-lamp CFL side, and an optical sheet OPS which laminates a prism sheet PRS between two diffusion sheets SC-D and SC-U are mounted. The adhered structure of the diffusion plate SCT and the transparent sheet TPS and the adhered structure of the diffusion plate SCT and the optical sheet OPS adopt any one of constitutions of the above-mentioned embodiments.

A liquid crystal panel (not shown in the drawing) is mounted above the backlight and a power source for driving cold cathode fluorescent lamps CFL, other necessary circuits and structural members are mounted on the liquid crystal panel.

Figure 12:
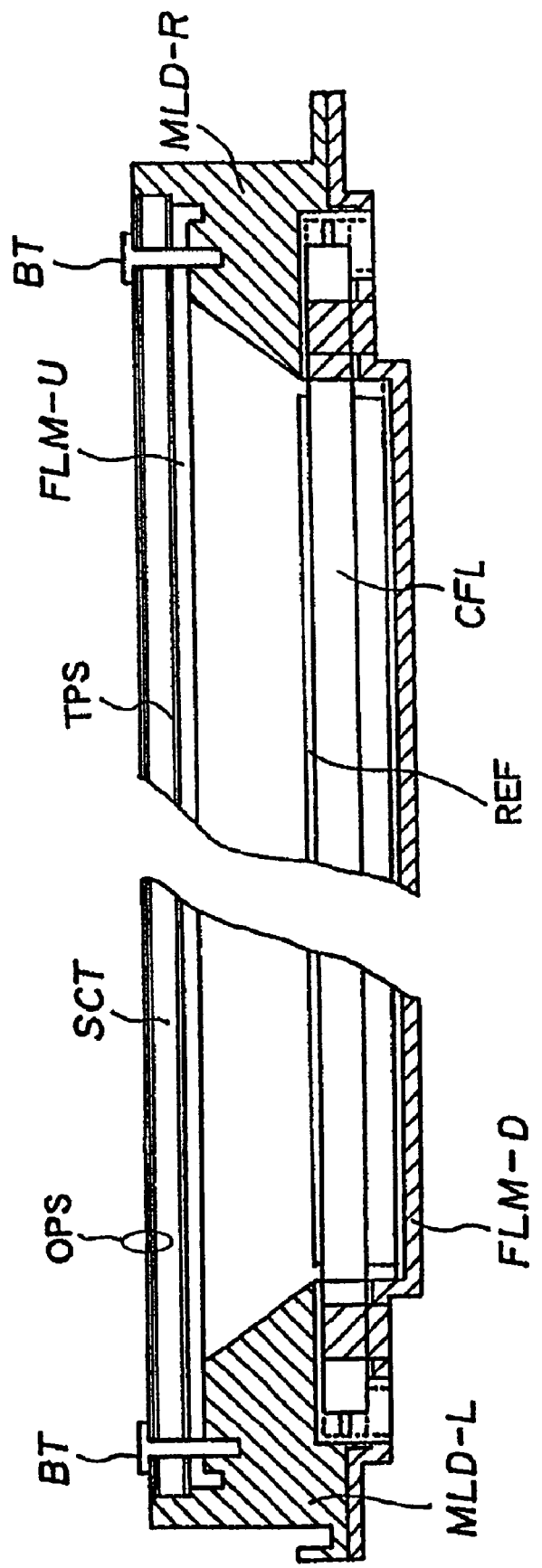
FIG. 12 is a cross-sectional view of an essential part taken along a line E-E of FIG. 11 for explaining the constitution of the backlight according to the present invention.

FIG. 12 is a cross-sectional view of an essential part taken along a line E-E in FIG. 11. A reflection plate REF having mountain-like reflection surfaces and a plurality of linear light sources CFL are fixed to an inner surface of the lower frame FLM-D. Then, the lower frame FLM-D and the upper frame FLM-U are laminated and, thereafter, both frames are fixed to each other at a given position using pawls NL shown in FIG. 11 and they are integrally formed by left and right molds MLD-L and MLD-R.

Then, on an upper surface of the upper frame FLM-U, a diffusion plate SCT which adheres a transparent sheet TPS to a lower surface thereof and an optical sheet OPS to which a diffusion sheet and a prism sheet are laminated are aligned and, thereafter, the laminated structure is fixed to left and right molds MLD-L, MLD-R using screws BT.

Figure 13:
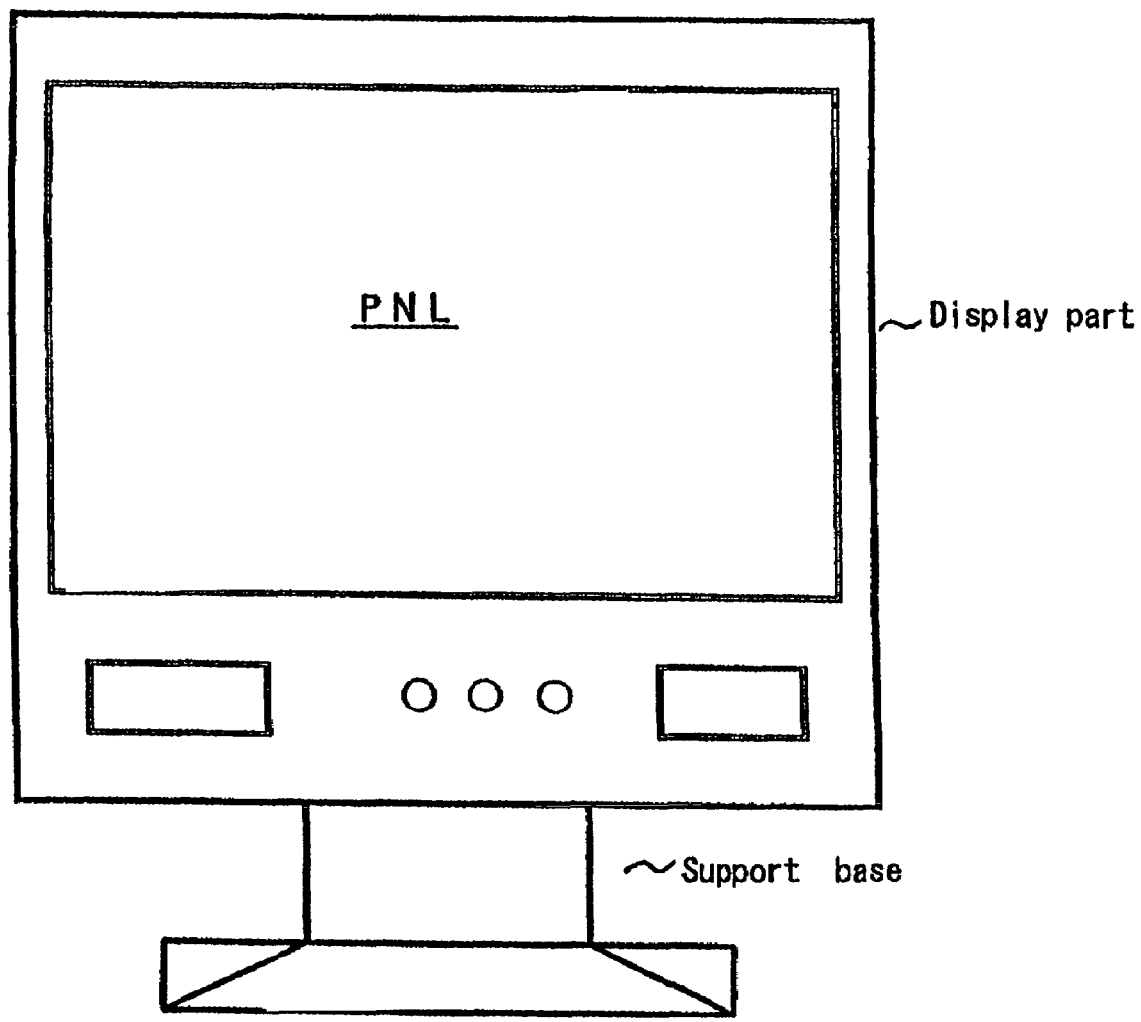
FIG. 13 is an appearance view showing an example of a display monitor, on which a liquid crystal display device provided with the backlight according to the present invention is mounted.
Figure 14:
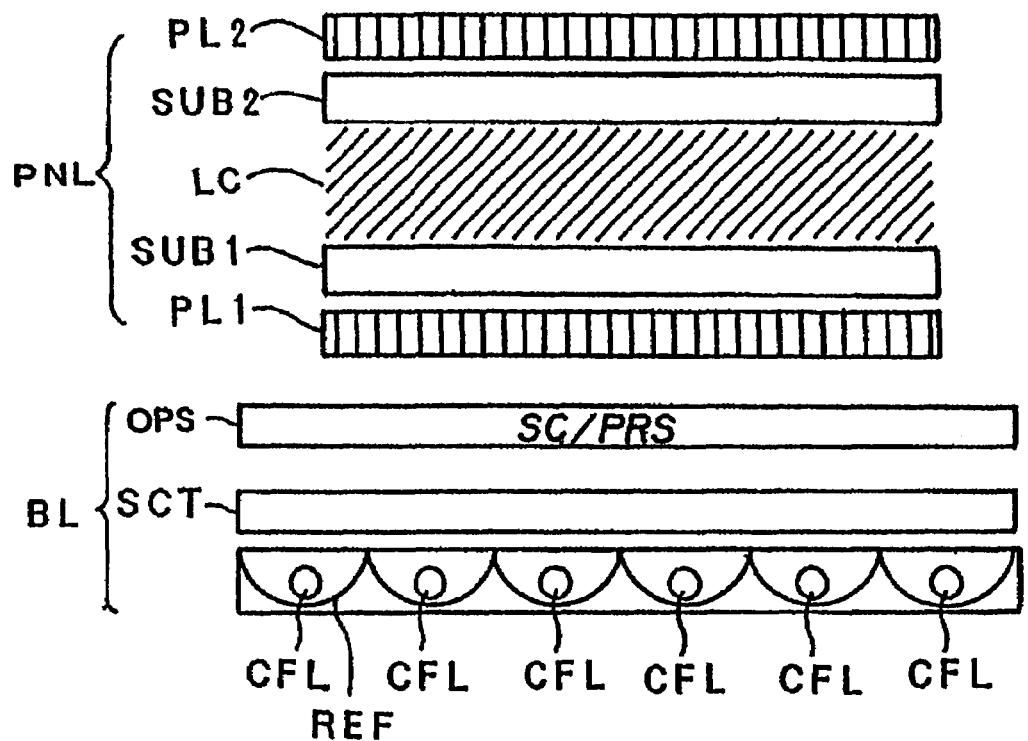
FIG. 14 is a cross-sectional view for schematically explaining a constitutional example of a liquid crystal display device provided with a direct backlight.
Figure 15:
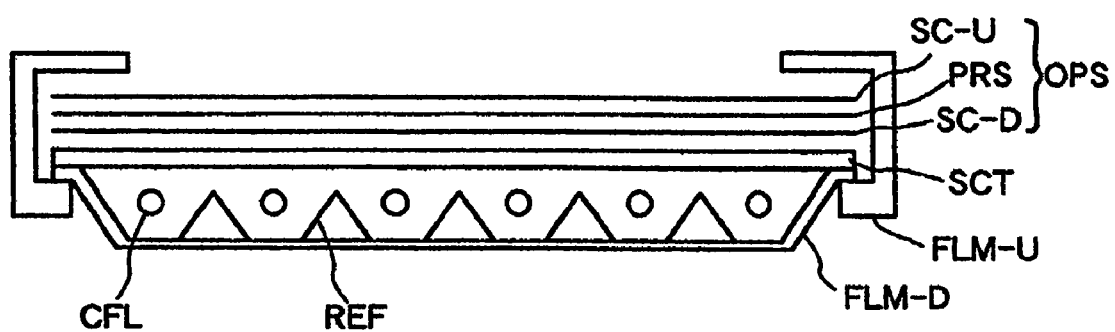
FIG. 15 is a cross-sectional view for schematically explaining a specific example of the backlight shown in FIG. 14.

FIG. 13 is an appearance view showing one example of a display monitor which mounts the liquid crystal display device provided with the backlight according to the present invention thereon. A backlight which constitutes a liquid crystal display device mounted on a screen, that is, a display part of the monitor has the constitution of the above-mentioned embodiment of the present invention. Since the drying conditions on the front and back surfaces of the diffusion plate brought about by turning on the cold cathode fluorescent lamps can be made substantially equal, a warp of a diffusion plate can be suppressed and the brightness distribution of the illumination light irradiated to a liquid crystal display element when the liquid crystal display device is used for a long time can be uniformly maintained thus realizing the display of high image quality.

As has been described heretofore, according to the present invention, it becomes possible to provide a liquid crystal display device which enables the irradiation of illumination light of uniform brightness distribution to a liquid crystal display element for a long period by suppressing a warp or a downward deflection of a diffusion plate disposed between a direct light source (backlight) and the liquid crystal display element.

What is claimed is:
1. A liquid crystal display device comprising:
   a liquid crystal display element and a direct-type backlight unit illuminating the liquid crystal display element from lower side, wherein
   the direct-type backlight unit comprises a concaved lower frame corresponding to a full area of the liquid crystal display element, a reflection plate arranged into the concaved lower frame, at least three cold cathode fluorescent lamps which are spaced evenly over and fixed to the lower frame, a diffusion plate which is arranged above and covers a full length of each of the cold cathode fluorescent lamps to controls the distribution of light from the cold cathode fluorescent lamps, a right mold covering only right side edges of the cold cathode fluorescent lamps, a left mold covering only left side edges of the cold cathode fluorescent lamps, and a spacer penetrating through the reflection plate, each of the right mold and the left mold comprises a body substantially defined by an inclined surface which inclines to the diffusion plate and located directly above only one end section of each of the cold cathode fluorescent lamps, an upper plane surface which is parallel to the diffusion plate and connects with a upper edge of the inclined surface, respectively, and the diffusion plate is supported by the spacer, the plane surface of the right mold and the plane surface of the left mold, and the diffusion plate is spaced at a predetermined distance from the cold cathode fluorescent lamps only by the spacer made of hard resin, the right mold and the left mold made of resin.

2. A liquid crystal display device according to claim 1, wherein the diffusion plate is formed to rectangular and has a notch at each short side thereof.

3. A liquid crystal display device according to claim 1, wherein each of the upper plane surfaces of the right mold and the left mold has a hole for screw, respectively.

4. A liquid crystal display device according to claim 1, wherein the reflection plate is formed with a plurality of parallel mountain shapes, and the plurality of cold cathode fluorescent lamps are arranged along valley portions thereof.

5. A liquid crystal display device according to claim 1, wherein the diffusion plate is mounted on an upper frame which directly contacts the spacer, the plane surface of the right mold and the plane surface of the left mold.

6. A liquid crystal display device according to claim 1, wherein the lower frame made of metal.

7. A liquid crystal display device according to claim 6, wherein the metal is aluminum or iron.

8. A liquid crystal display device according to claim 1, wherein the spacer is formed of a column shape.

9. A liquid crystal display device according to claim 1, wherein the diffusion plate is bent to slightly curve away the cold cathode fluorescent lamps.

10. A liquid crystal display device according to claim 1, wherein the right mold and the lower frame sandwich said right side edges of the cold cathode fluorescent lamps, and the left mold and the lower frame sandwich left side edges of the cold cathode fluorescent lamps.

11. A liquid crystal display device according to claim 1, wherein the right mold covers only part of each said right side edges of the cold cathode fluorescent lamps, and the left mold covers only part of each left side edges of the cold cathode fluorescent lamps.

12. A liquid crystal display device according to claim 1, wherein the diffusion plate is fixed to left and right molds using screws.

* * * * *